United States Patent
Ornitz et al.

[11] Patent Number: 5,986,755
[45] Date of Patent: Nov. 16, 1999

[54] ELASTIC RADIATION SCATTER-DETECTING SAFETY DEVICE ANALYZER APPARATUS PROVIDED WITH SAFETY DEVICE AND METHOD FOR CONTROLLING A LASER EXCITATION SOURCE

[75] Inventors: Barry Louis Ornitz, Kingsport; Michael Joseph Pearce, Blountville; Daniel Charles Alsmeyer; Vincent Alvin Nicely, both of Kingsport, all of Tenn.

[73] Assignee: Eastman Chemical Company, Kingsport, Tenn.

[21] Appl. No.: 08/947,816

[22] Filed: Oct. 9, 1997

Related U.S. Application Data

[60] Provisional application No. 60/040,775, Mar. 14, 1997.

[51] Int. Cl.$^6$ .............................. G01J 3/44; G01N 21/65
[52] U.S. Cl. ...................................... 356/301; 219/121.62
[58] Field of Search .................... 356/301; 219/121.62

[56] References Cited

U.S. PATENT DOCUMENTS

| | | | |
|---|---|---|---|
| 4,573,761 | 3/1986 | McLachlan et al. | 356/301 |
| 4,953,976 | 9/1990 | Alder-Golden et al. | 356/301 |
| 5,196,672 | 3/1993 | Matsuyama et al. | 219/121.62 |
| 5,318,024 | 6/1994 | Kittrell et al. | 128/665 |
| 5,526,112 | 6/1996 | Sahagen | 356/72 |
| 5,751,415 | 5/1998 | Smith et al. | 356/301 |

*Primary Examiner*—Robert H. Kim
*Assistant Examiner*—Zandra V. Smith
*Attorney, Agent, or Firm*—Jaeckle Fleishmann & Mugel, LLP

[57] ABSTRACT

A safety device for detecting elastically scattered radiation comprises: an excitation source of substantially monochromatic radiation having a controllable output, a detector for detecting elastically scattered radiation collected from a specimen illuminated by the excitation source, and a signal conditioning circuit that comprises a transducer and a comparator. An output transducer signal representative of the elastically scattered radiation is compared with a predefined threshold signal. If the output transducer signal is less than the threshold signal, a control output signal coupled to the excitation source causes the output of the source to be reduced. The safety device is included in an analyzer apparatus, preferably a Raman spectrometry apparatus that further includes an optical probe. The probe comprises a fluid-tight body that encloses three optical channels, preferably comprising optical fibers, that carry monochromatic radiation to a specimen and separately collect inelastically and elastically scattered radiation from the illuminated specimen. In a method for controlling a radiation source in an analyzer apparatus, a specimen is analyzed by an excitation source having a controllable output, preferably a laser. Elastically scattered radiation from the illuminated specimen is collected, detected, and transduced into an output transducer signal representative of the scattered radiation. If the output transducer signal is less than a predefined threshold signal, a control output signal coupled to the laser causes its output to be reduced.

45 Claims, 4 Drawing Sheets

ELASTIC RADIATION SCATTER-DETECTING SAFETY DEVICE ANALYZER APPARATUS PROVIDED WITH SAFETY DEVICE AND METHOD FOR CONTROLLING A LASER EXCITATION SOURCE

CROSS REFERENCE TO RELATED APPLICATIONS

This application claims priority from Provisional Application Ser. No. 60/040,775, RAYLEIGH BACKSCATTER CONTROL APPARATUS AND METHOD, filed Mar. 14, 1997, by Ornitz et al.

This application is also related to the following co-pending applications: attorney docket number RAIO 104, IMPROVED RAYLEIGH BACKSCATTER CONTROL APPARATUS AND METHOD, filed Mar. 14, 1997; attorney docket number RAIO 105, CHEMICAL ANALYZER OPTICAL PROBE AND METHOD OF MANUFACTURING SAME, filed Mar. 14, 1997; attorney docket number RAIO 106, IMPROVED LOW NOISE RAMAN ANALYZER SYSTEM, filed Mar. 14, 1997; and attorney docket number RAIO 107, CHEMICAL ANALYZER WITH FREE SPACE COMMUNICATION LINK, filed Mar. 14, 1997, the disclosures of all of which are incorporated herein by reference.

FIELD OF THE INVENTION

The invention relates generally to laser excitation sources, particularly to a safety device and method for controlling a laser excitation source, and more particularly to an elastic radiation scatter-detecting safety device for controlling a laser excitation source included in a Raman spectrometry apparatus.

BACKGROUND OF THE INVENTION

When incident radiation interacts with matter, it may undergo a process called scattering. As described in J. B. Ingle, Jr. and S. R. Crouch, "Molecular Scattering Methods," Chapter 16 in *Spectrochemical Analysis,* 1988, Prentice-Hall, Englewood Cliff N.J., pp 494–499, scattering may be elastic, i.e., the wavelength of the scattered radiation is unchanged from that of the incident radiation, or inelastic, i.e., the scattered radiation has a wavelength different from that of the incident radiation.

In one form of elastic radiation scattering, referred to as Rayleigh scatter, the dimensions of the scattering particles, i.e., atoms and molecules, are much smaller than the incident beam wavelength. In general, Rayleigh scatter is inversely proportional to the fourth power of the wavelength of the incident light. Liquids exhibit significantly stronger Rayleigh scatter than do gasses.

One type of inelastic radiation scattering is referred to as Raman scatter; incident photons are scattered with either a gain or loss of energy, and the energy difference between the scattered and incident radiation is commonly referred to as the Raman shift. The Raman shift spectrum represents the energy of various molecular vibrations and conveys chemical and molecular information regarding the matter studied. Raman spectrometry is widely used in the analysis of various materials and is capable of providing both qualitative and quantitative information about the composition and/or molecular structure of chemical substances.

Raman scattering signals are very weak, much weaker than Rayleigh scattering signals. Typically a few Raman scattering photons exist among millions of elastically scattered photons. This small Raman signal among the large elastically scattered signals places severe demands on the instrumentational design of any spectrometer used to collect Raman spectra.

A Raman spectrometry apparatus typically comprises a laser excitation source of monochromatic light, a probe, and a fiber optic cable that includes transmission and reception fiber channels connecting the laser with the probe. The probe may be remotely located from the laser light source; it may, for example, be situated within a chamber such as a reactor or a pipe where a chemical reaction involving solids, liquids, gasses, or mixtures thereof is occurring. The fiber optic cable includes transmission and reception fibers. The output of the laser is conveyed by a transmission fiber channel to the probe, exits the probe, and illuminates the material within the reaction chamber. Raman scattering resulting from irradiation of the material is conveyed by a reception fiber channel to a detector and spectrograph included in the spectrometry apparatus.

Lasers are classified according to their power output, from very low power "exempt" lasers of Class I to high power lasers of Classes III and IV, whose output range from about 1 mW to greater than 500 mW. Lasers used as excitation sources for Raman spectrometry are frequently Class III or IV and therefore have output energy levels that present a potential hazard. If the probe were inadvertently removed from a material being measured, the high laser output could damage the cornea or retina of an operator's eyes and could also ignite flammable substances in the vicinity, causing a fire or explosion. To ensure personnel safety and minimize the hazards of fire or explosion, it would be highly desirable to have a reliable control for automatically turning off the laser if the probe were to be removed from the material under examination or if a break were to occur in a fiber optic channel. Such a control is provided by the present invention.

SUMMARY OF THE INVENTION

The present invention is directed to a safety device for use with an analyzer apparatus, in particular, a Raman spectrometry apparatus provided with an optical probe, and further directed to a method that uses detection of elastic radiation scattering collected from a specimen illuminated by a laser excitation source to control the excitation source.

In accordance with the invention, a safety device for detecting elastically scattered radiation comprises: a source of substantially monochromatic radiation having a controllable output, detecting means for detecting elastically scattered radiation collected from a specimen illuminated by the source of substantially monochromatic radiation, and a signal conditioning circuit. The signal conditioning circuit comprises: transducing means for converting detected elastically scattered radiation from the specimen into an output transducer signal, and a comparator for comparing the output transducer signal with a predefined threshold signal and generating a control output signal that is representative of whether the output transducer signal is greater than, equal to, or less than the threshold signal. The control output signal is coupled to the source of monochromatic radiation and causes the output of the radiation source to be reduced when the output transducer signal is less than the predefined threshold signal.

In a preferred embodiment of the invention, the source of substantially monochromatic radiation comprises a laser, the elastically scattered radiation detecting means comprises a silicon photodetector, and the transducing means comprises a transimpedance amplifier. Also in a preferred embodiment, the safety device further includes latch means comprising a relay and further comprising an on/off switch. In another preferred embodiment, the signal conditioning circuit further comprises a buffer amplifier coupled to the transducing means and a reference voltage source coupled to the buffer amplifier. The buffer amplifier is selectively connected to the comparator for generating a test output to adjust a trip point of the comparator.

Further in accordance with the present invention is an analyzer apparatus, preferably a Raman spectrometry apparatus that comprises the described safety device and an optical probe. In one embodiment, the analyzer apparatus further comprises a filter module that includes a band pass (BP) filter and a rejection filter, preferably a long pass (LP) filter.

The optical probe comprises a fluid-tight body that encloses: a first optical channel for carrying substantially monochromatic radiation from an excitation source to illuminate a specimen, a second optical channel for collecting radiation elastically scattered by the illuminated specimen, and a third optical channel for collecting radiation inelastically scattered by the illuminated specimen. Each of the three optical channels comprises at least one optical fiber; in an embodiment described hereinafter, the third optical channel includes a plurality of optical fibers. In one particular embodiment, one optical fiber comprising the second optical channel and five optical fibers comprising the third optical channel are disposed in a substantially circular pattern around an optical fiber that comprises the first optical channel.

In a method for controlling a radiation source in an analyzer apparatus, a specimen being analyzed by the apparatus is illuminated by an excitation source having a controllable output, preferably a laser. Elastically scattered radiation from the illuminated specimen is collected, detected, and transduced into an output transducer signal representative of the scattered radiation. If the output transducer signal is less than a predefined threshold signal, a control output signal coupled to the laser causes its output to be reduced.

BRIEF DESCRIPTION OF THE DRAWINGS

in FIG. 4, dotted lines indicate optical fibers and solid lines indicate electrical conductors.

FIG. 5 is a partial sectional view of an optical probe useful for the analyzer apparatus represented by FIG. 1.

FIG. 6 is an enlarged end view of the optical fibers at the tip of the probe depicted in FIG. 5.

DETAILED DESCRIPTION OF THE INVENTION

As used herein, "optic(al)" and "light" refer to electromagnetic radiation, whether or not visible to the human eye.

Figure 1:
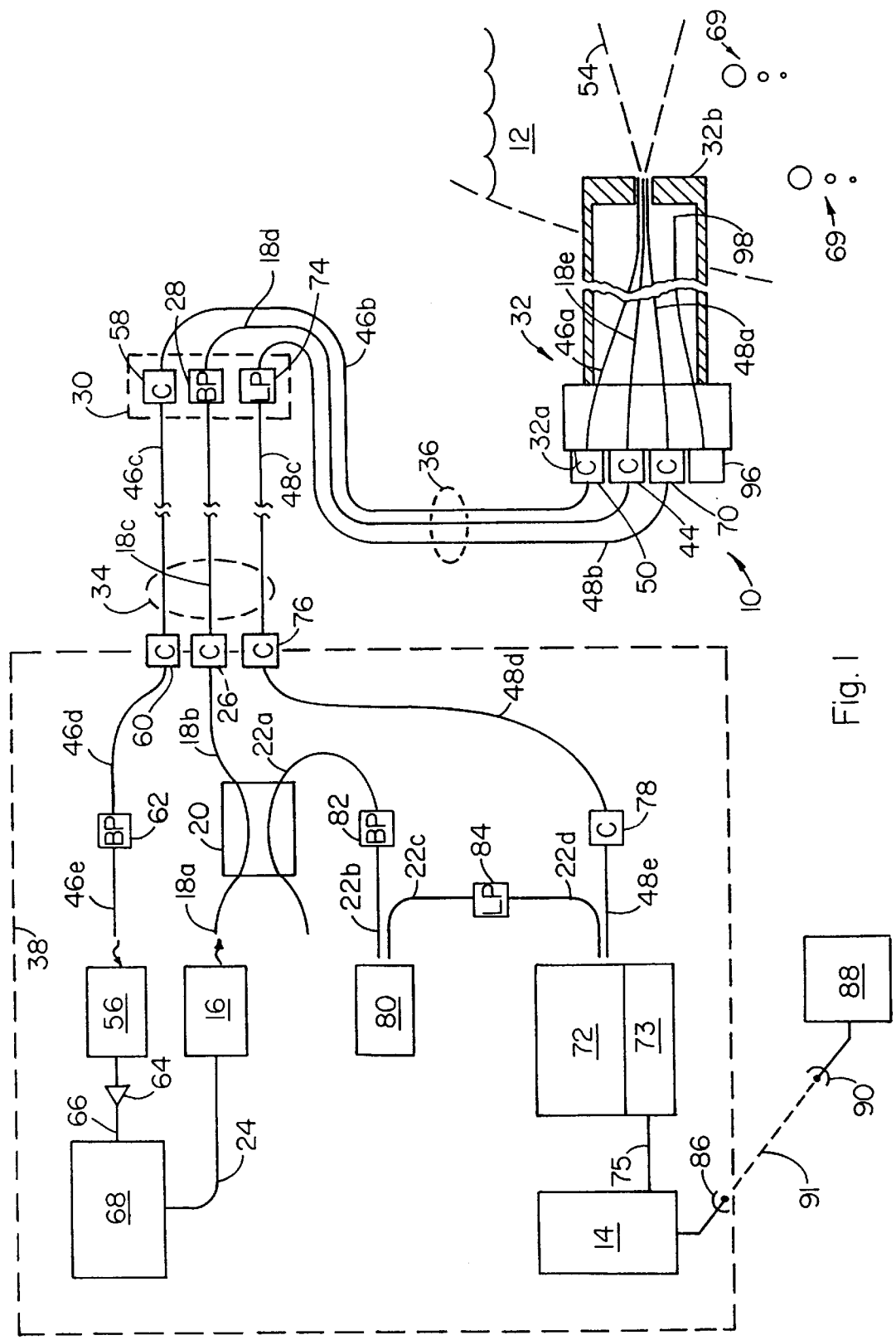
FIG. 1 is a system diagram for a preferred analyzer apparatus, a Raman spectrometry apparatus, in accordance with the invention.

FIG. 1 shows a preferred analyzer apparatus 10 that evaluates a specimen of interest 12 and provides on a computer 14 an analyzer output indicative of the presence or amount of one or more chemical constituents of specimen 12. Analyzer apparatus 10 illuminates specimen 12 with narrow-band light, collects scattered light from specimen 12, optically isolates a Raman scattering component from the scattered light, and evaluates the Raman scattering component to ascertain the analyzer output. Simultaneously, according to one aspect of the invention, apparatus 10 isolates an elastic scattering component from the radiation scattered by specimen 12. If the elastic scattering component falls below a threshold level, such as may result from, for example, disconnecting or breaking of an optical fiber or withdrawing of the probe from the specimen, the narrow-band light illumination is shut off. This shut off technique is particularly effective if specimen 12 is a liquid, which may include a molten polymer composition, that has a significantly higher elastic scatter level than does a gas such as air.

Laser 16, shown in FIG. 1, launches essentially monochromatic, narrow-band light into fiber 18a of 1-by-2 beamsplitter 20. Although laser 16 can have an emission wavelength ranging from the ultraviolet (UV) through the visible to the infrared (IR) regions, a wavelength of about 810 nanometers (nm) for the narrow-band light is particularly useful for Raman spectrometry. Shorter wavelengths increase the amount of Raman scatter but may also produce unwanted fluorescence in some specimens. Longer wavelengths are less likely to produce fluorescence but would yield a lower Raman signal. A diode laser producing light having a wavelength between about 750 nm and 850 nm is preferred.

Laser 16 can have a multimode output and be capable of emitting 700 mW to 1.2W of optical power during operation. Laser 16 also includes a driver circuit with a control input at line 24 and, if a diode laser, a temperature control circuit as well. The control input of laser 16 controls the amount or intensity of narrow band light injected into fiber 18a.

Beamsplitter 20 divides the laser light launched into fiber 18a between fibers 18b and 22a. The light can be equally or unequally divided between fibers 18b and 22a. The narrow band light passes from fiber 18b to a fiber 18c via connector pair 26, which includes a male connector end holding each fiber end, the connector ends facing each other inside an alignment bushing. Standard Matching Adaptor (SMA)-type connector pairs are preferred for low cost and robustness, but other known styles such as ST or FC are also contemplated. Fiber 18c connects to band pass (BP) filter 28 of filter module 30. Laser light passes through BP filter 28 and fiber 18d to probe 32, which is adapted to contact specimen 12. Fibers 18c and 18d are preferably part of armored cable assemblies 34 and 36, respectively.

Analyzer apparatus 10 is preferably constructed to include main analyzer unit 38, which is desirably situated in a control room or other location that can provide the necessary electrical power and a benign environment. Probe 32 is located at the site of specimen 12, and filter module 30 is disposed near probe 32. Armored fiber cable assemblies 34 and 36 connect, respectively, main analyzer unit 38 to filter module 30 and filter module 30 to probe 32. Cable assembly 34 can be tens or hundreds of meters long.

Transmitting radiation over long fiber optic cables can produce a large interfering background signal resulting from Raman scatter in the fiber core and cladding. This problem can be remedied by the use of properly placed optical filters, which can be either of two general types. A band pass (BP) filter, which permits only a very narrow range of wavelengths to transmit, is used with the excitation radiation prior to interaction with a sample. The BP filter removes virtually all background radiation and allows a clean, narrow excitation beam to illuminate the sample.

A second type of filter, referred to as a rejection filter, removes essentially all radiation at the incident wavelength, while allowing other wavelengths to pass. There are two general forms of rejection filters; one of these, referred to as a notch filter, is essentially the opposite of a BP filter. A notch filter rejects a narrow band, while allowing all other wavelengths to pass. The other form of rejection filter is a long pass (LP) filter, which allows all wavelengths above a specified wavelength to pass and rejects all other wavelengths.

To remove Raman scatter generated from fibers 18a, 18b, and 18c by laser light passing through them, which might be confused with Raman scatter from specimen 12, band pass (BP) filter 28 is provided in filter module 30, which is located as close as possible to probe 32 to minimize fiber-generated Raman scatter arising from fiber 18d. BP filter 28 passes narrow band light from laser 16 but blocks fiber-generated Raman scattering originating in fibers 18a, 18b, and 18c from reaching fiber 18d. The fiber-generated Raman scattered light lies outside the pass band of BP filter 28 and thus is rejected by filter 28.

Figure 2:
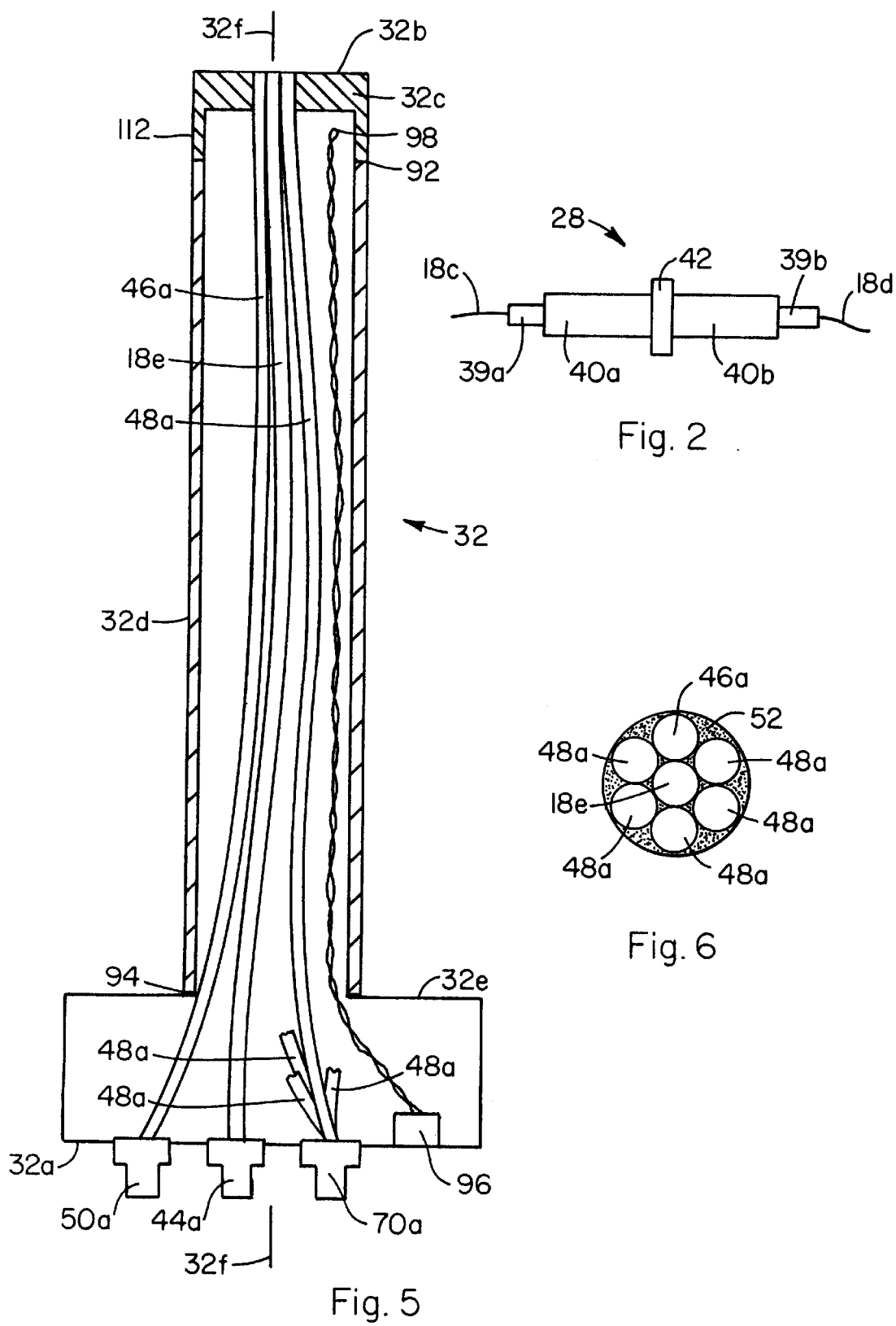
FIG. 2 is a schematic representation of a band pass filter included in the analyzer apparatus represented by FIG. 1.

A preferred embodiment of BP filter 28 is depicted in FIG. 2. Fiber connectors 39a and 39b, preferably of the SMA type, hold the ends of fibers 18c and 18d against 0.25-pitch gradient index (GRIN) lenses 40a and 40b, respectively. GRIN lenses 40a and 40b serve to collimate and focus the radiation entering and passing optical filter 42, which is sandwiched between lenses 40a and 40b and provides the desired spectral filtering characteristics.

Radiation rejected by a filter may be absorbed by surrounding metallic components and turned into heat, or it may be reflected back to an optical fiber. Optical fibers are commonly coated with a polyimide buffer layer and may be connected by epoxy adhesive materials. Both polyimide and epoxy materials are often fluorescent, and radiation reflected back to an optical fiber coated or connected with such materials may induce fluorescence in the fiber. The resulting fluorescent signal can distort a radiation signal produced by specimen 12, especially when specimen 12 is highly scattering.

Unlike polyimide buffer coated optical fibers, gold coated fibers do not induce fluorescence. Gold coated optical fibers are, however, more expensive than polyimide coated fibers. Should expense preclude the use of gold coated fibers throughout analyzer apparatus 10, it is advantageous to employ them in the construction of probe 32, i.e., to use gold coated fibers for fibers 18d,18e, 46a, 46b, 48a, and 48b.

Turning again to FIG. 1, fiber 18d releasably connects to probe 32 by connector pair 44 located at proximal end 32a of probe 32 and passes narrow band light to fiber 18e, which extends from connector pair 44 to distal end 32b of probe 32. Also housed in probe 32 are fibers 46a and 48a; 48a may comprise a plurality, five in one particular embodiment, of fibers 48a. The line representing fibers 48a, and some other lines in FIG. 1, are shown thickened to indicate multiple optical fibers in particular embodiments. Fiber 46a connects to a connector pair 50 at proximal end 32a, and at distal end 32b is soldered or otherwise held in position together with fibers 18e and 48a. At end 32b, the fibers are polished to a mirror finish and arranged as shown in FIG. 6. Solder material 52 holds the fiber ends in place and seals the probe at end 32b.

Narrow band light exits fiber 18e and illuminates specimen 12 in a detection zone 54, which is defined by the overlap of the conical output from fiber 18e and each of the fibers 48a. Fibers 46a and 48a collect some of the scattered light, which includes a relatively strong elastic component having the same wavelength as the narrow band light from laser 12, together with a relatively weak Raman component whose wavelength differs from that of the light from laser 12. In one particular embodiment, analyzer apparatus 10 uses five fibers 48a to boost the detected Raman component and a single fiber 46a to sense the elastic component for continuity.

Scattered light travelling down fiber 46a is directed to detector 56 via connector 50, fibers 46b–e, connector pairs 58 and 60, and band pass (BP) filter 62. BP filter 62 passes the narrow band light wavelength and is substantially identical to previously described BP filter 28. The purpose of BP filter 62 is to prevent sunlight, roomlight, or any extraneous light collected by fiber 46a from being mistaken for elastically scattered light. BP filter 62 has the further effect of preventing the weaker Raman component from reaching detector 56. Amplifier 64 is coupled to detector 56 to provide an amplified detector output signal on line 66.

Advantageously, the output from detector 56, which is representative of the elastic scatter component, is fed back through signal conditioning circuit 68 as a laser control input signal to laser 16 on line 24. Circuit 68 compares the detector output signal on line 66 with a predefined threshold signal. If the detector output signal is above the threshold signal, indicating that the optical system of analyzer apparatus 10 is intact, signal conditioning circuit 68 provides an output signal on line 24 that maintains laser 16 at its normal, relatively high output level. If, on the other hand, the detector output signal is below the threshold signal, indicating a fiber disconnection or removal of probe 32 from specimen 12, circuit 68 provides an output signal on line 24 that shuts off laser 16, or at least controls it to a lower intensity level. This lower intensity level can be set such that the light intensity emitted from probe fiber 18e, and preferably from fiber 18b, is within BSI/EN 60825-1 class 1 operation, i.e., nonhazardous direct viewing. In this way, analyzer apparatus 10 can operate with high laser light levels during normal operation and automatically shut down if a discontinuity is sensed by detector 56, thereby avoiding hazard to the eyes of an operator.

Signal conditioning circuit 68 provides for discrimination between transient losses in the elastic scatter signal, such as may be caused by small bubbles 69 of air or other gas passing through detection zone 54, and longer lived losses in the signal resulting from fiber disconnection or withdrawal of probe 32 from specimen 12. Circuit 68 continues driving laser 16 at its high operational intensity level in the presence of the truly transient losses but shuts laser 16 down to the lower intensity level for the longer-lived losses. This discrimination function prevents unnecessary shutdowns during operation of analyzer apparatus 10.

Referring again to FIG. 1, fibers 48a are unsupported in probe 32 except at distal end 32b, where they are arranged around emitting fiber 18e, and at proximal end 32a, where they are bundled together at male connector end 70a, as shown in FIG. 5. The other male connector end 70b of pair 70 of FIG. 1 holds a single fiber 48b in alignment with the fibers 48a, where fiber 48b has a diameter sufficiently large to capture light emitted from all of the fibers 48a. For example, if fibers 48a are of about 100 $\mu$m core diameter, fiber 48b can be of about 300 $\mu$m core diameter. This arrangement greatly simplifies interconnections in analyzer apparatus 10; using one large fiber 48b rather than five separate small fibers to collect light from fibers 48a allows a four-fifths reduction in the number of connector pairs and filters required to convey Raman scatter radiation from probe 32 to main analyzer unit 38. Scattered light is carried by fiber 48b to the entrance slit of optical spectrograph 72 via a rejection filter, preferably a LP filter 74, fibers 48c–e, and connector pairs 76 and 78. LP filter 74 is of similar construction to BP filter 28 shown in FIG. 2, except that BP filter 28 is fabricated to block the narrow band light of laser 16 and pass longer wavelengths. For a laser having a wavelength of, for example, 810 nm, the spectral transmission of LP filter 74 preferably is less than $10^{-6}$ at 810 nm and rises to half of its peak transmittance at about 833 nm. Filter module 30 is preferably mounted close to probe 32 to keep fiber 48b short, less than about one meter, so that no appreciable fiber-generated Raman component can be produced in fiber 48b by elastic scattered light. LP filter 74 blocks any elastic scattered light from reaching fibers 48c–e.

Fibers 18a–e, 46a, 48a, 48e, and 22a–d are preferably relatively small diameter (100 μm core diameter) fibers, while fibers 48b–d are preferably relatively large diameter (300 μm core diameter) fibers. Fibers 46b–e can be either small or large diameter, but preferably are no smaller than fiber 46a. All can be gradient-indexed or, preferably, step-indexed for increased light levels. A plurality of fibers 48e are held at connector pair 78, preferably in a "six-around-one" pattern for optimal coupling to fiber 48d, while at the entrance slit to spectrograph 72 they are held in a linear array.

Referring again to FIG. 1, diamond reference 80 is provided in main analyzer unit 38. Narrow band light is carried by fibers 18a, 22a, and 22b from laser 16 to the surface of diamond 80. BP filter 82, substantially identical to BP filters 28 and 62, blocks fiber-generated Raman scatter. Preferably, six fibers 22c surround fiber 22b at the diamond surface to capture light scattered from diamond 80. LP filter 84, substantially identical to LP filter 74, blocks elastic light scattered from fibers 22d. Preferably, a plurality of fibers 22d are arranged in a "six-around-one" pattern at LP filter 84 and in a linear configuration at the entrance slit of spectrograph 72.

The linear arrays of fibers 22d and 48e are arranged collinearly at the entrance slit of spectrograph 72. Spectrograph 72 can be, for example, a model SP-150 spectrograph, available from Acton Research Corp., provided with a ruled grating that has 400 grooves/mm and is blazed at 750 nm. A detector array 73 having an array of, for example, 750 pixels×240 pixels, simultaneously monitors the spatially separated Raman scattered light spectra from specimen 12 and diamond reference 80. The output from detector array 73 is fed to computer 14 over line 75. Software residing in computer 14 provides for using the Raman spectrum of specimen 12 together with the diamond Raman spectrum and a predetermined calibration to determine the composition of specimen 12, as described in U.S. Pat. Nos. 5,455,673, 5,610,836, and 5,638,172, and in co-pending U.S. application Ser. No. 08/947,689, METHOD FOR STANDARDIZING RAMAN SPECTROMETERS TO OBTAIN STABLE AND TRANSFERABLE CALIBRATIONS, filed Oct. 9, 1997 by Carman et al., the disclosures of all of which are incorporated herein by reference.

Computer 14 may be equipped with transceiver 86, which can be an antenna or an infrared transmitter/receiver. Instructions can be sent to, and information received from, computer 14 using a second computer, for example, laptop computer 88 equipped with transceiver 90 similar to transceiver 86. Such communication can be carried out over a wireless, fiberless free space path 91, allowing one to freely move from place to place with computer 88, and thereby permitting greater flexibility and choice in a mounting location for main analyzer unit 38. Transceivers 86 and 90 can be PC/MCIA cards, known in the computer industry. Computer 88 can be provided with a keyboard and mouse for sending queries and commands to computer 14, as well as a display for graphing or otherwise showing the analyzer output data transmitted from computer 14. This arrangement would enable a reduction in the size, weight, and electrical requirements of main analyzer unit 38.

A preferred embodiment of probe 32, schematically depicted in FIG. 5, has a body that includes terminus 32c, shank 32d, and connector housing 32e, all made of stainless steel or other suitable inert materials capable of withstanding temperatures of several hundred °C. Terminus 32c, shank 32d, and connector housing 32e are rotationally symmetric about probe axis 32f and are connected by solder joints 92 and 94, as shown. The outer surface comprising terminus 32c, solder joint 92, and shank 32d is polished to a smooth finish to permit sealing inside the bore of a standard pipe fitting or other container that holds specimen 12. Probe 32, in particular terminus 32c, can be constructed by the method described in Buchanan et al., U.S. application Ser. No. 08/450,597, ROBUST SPECTROSCOPIC OPTICAL PROBE, filed May 25, 1995, now U.S. Pat. No. 5,657,404, the disclosure of which is incorporated herein by reference.

Fibers 18e, 46a, and 48a, shown in FIG. 6, extend from their respective male connector ends 44a, 50a, and 70a at proximal probe end 32a to distal end 32b, as shown in FIG. 5. Each of the fibers are preferably step-indexed and include silica or doped silica core/cladding and also a thin outer buffer layer of gold, nickel, or other inert metal along their entire length. Male connector ends 44a, 50a, and 70a are fixed to connector housing 32e to permit probe 32 to be conveniently disconnected and reconnected to cable assembly 36 for ease of installation and servicing. Also affixed to housing 32e is connector 96 for temperature sensor 98, which are optionally included in probe 32. Temperature sensor 98 is preferably disposed close to distal end 32b for diagnostic purposes to ensure that probe 32 does not exceed its rated temperature. Alternatively, the output of sensor 98 can be used as a rough indication of the temperature of specimen 12; thus, probe 32 may serve a dual purpose as a fiber optic chemical analysis probe and as a specimen thermometer. Although known fiber optic temperature sensors can be used for sensor 98, electrical sensors are preferable for their simplicity; especially preferable for its low cost and reliability is a thermocouple such as, for example, a type K thermocouple. The output of sensor 98 can be monitored with a portable, hand-held device coupled directly to connector 96, or with computer 14, in which case an additional channel such as a twisted wire pair can be included in cable assemblies 34 and 36 of FIG. 1.

As shown in FIG. 6, the optical fibers in probe 32 may be efficiently combined in a "six-around-one" configuration. Central fiber 18e carries the signal from laser 16 to specimen 12. Fiber 46a carries the elastic scatter signal, and five fibers 48a carry Raman scatter signals to main analyzer unit 38.

Figure 3:
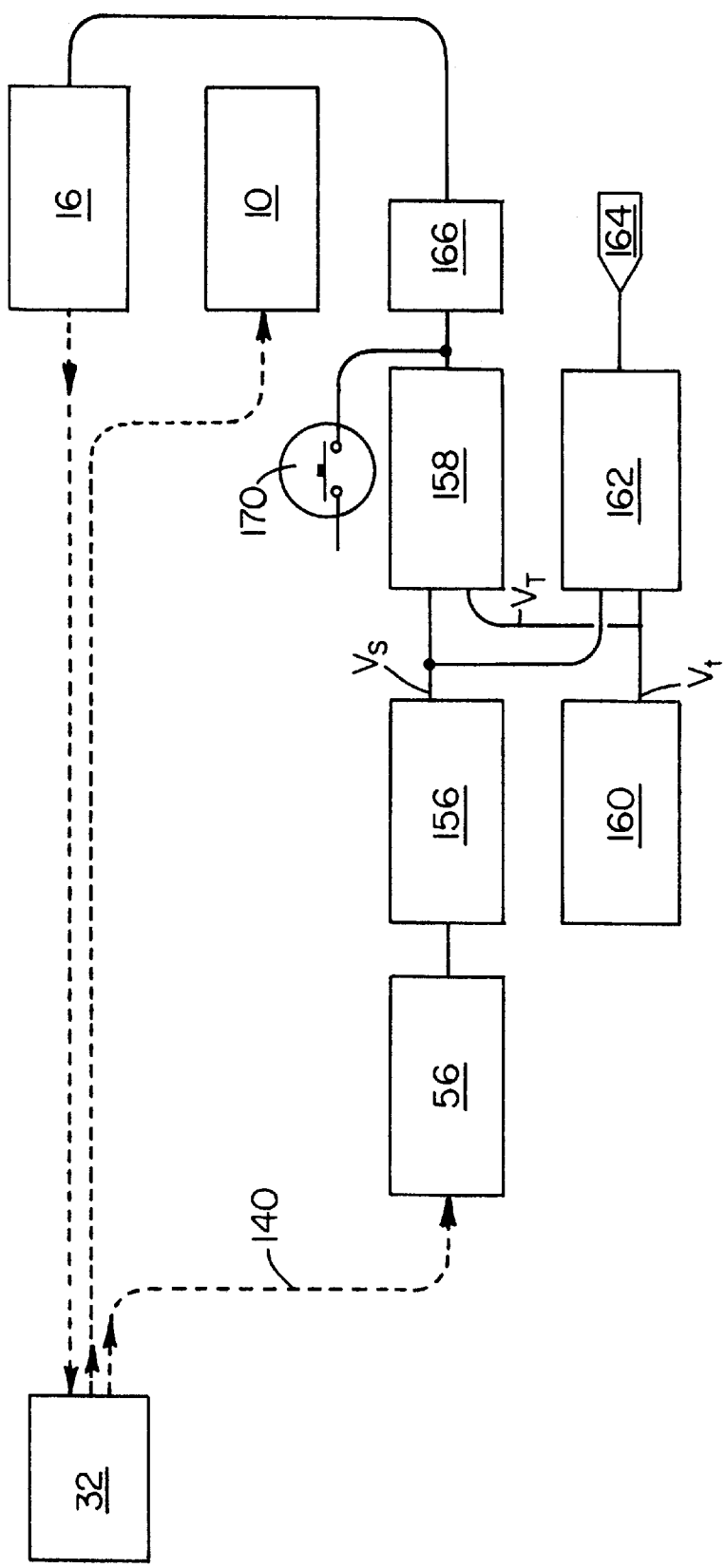
FIG. 3 is a block diagram of the signal conditioning circuit included in the analyzer apparatus represented by FIG. 1.

With reference to the schematic diagram of FIG. 3 representing signal conditioning circuit 68, elastically scattered light at the wavelength of laser 16 is coupled by one or more optical fibers generally indicated as 140 to silicon photodetector 56, which is sensitive to the wavelength of light from laser 16 and produces a current proportional to the amplitude of the laser light striking photodetector 56. The current is amplified by transimpedance amplifier 156, which has a short time constant, to produce an output voltage signal $V_s$.

Voltage signal $V_s$ is one input to comparator 158, the other input to comparator 158 being a constant voltage $V_t$ supplied by reference voltage source 160. Reference voltage source 160 is coupled to buffer amplifier 162, which is selectively operable by trip point switch 164 to set the trip point of comparator 158. More specifically, buffer amplifier 162 generates an analog output voltage that is proportional to the difference between the transimpedance amplifier output voltage $V_s$ and the reference voltage $V_t$. The analog output of buffer amplifier 162 is used to test the circuitry and adjust the trip point of comparator 158.

Relay 166 is coupled between a power source, not shown, and laser 16, which is initially powered by pressing push button start/reset switch 170. By holding start/reset switch 170 in a depressed position, power is temporarily supplied to laser 16 until signal conditioning circuit 68 is operational. If elastically scattered light is present at sufficient amplitude such that $V_s$ is greater than $V_t$, the output of comparator 158 is sufficiently high to keep relay 166 latched on, thereby supplying power to laser 16. A low elastic light scattering signal releases relay 200 and turns off laser 16.

Figure 4:
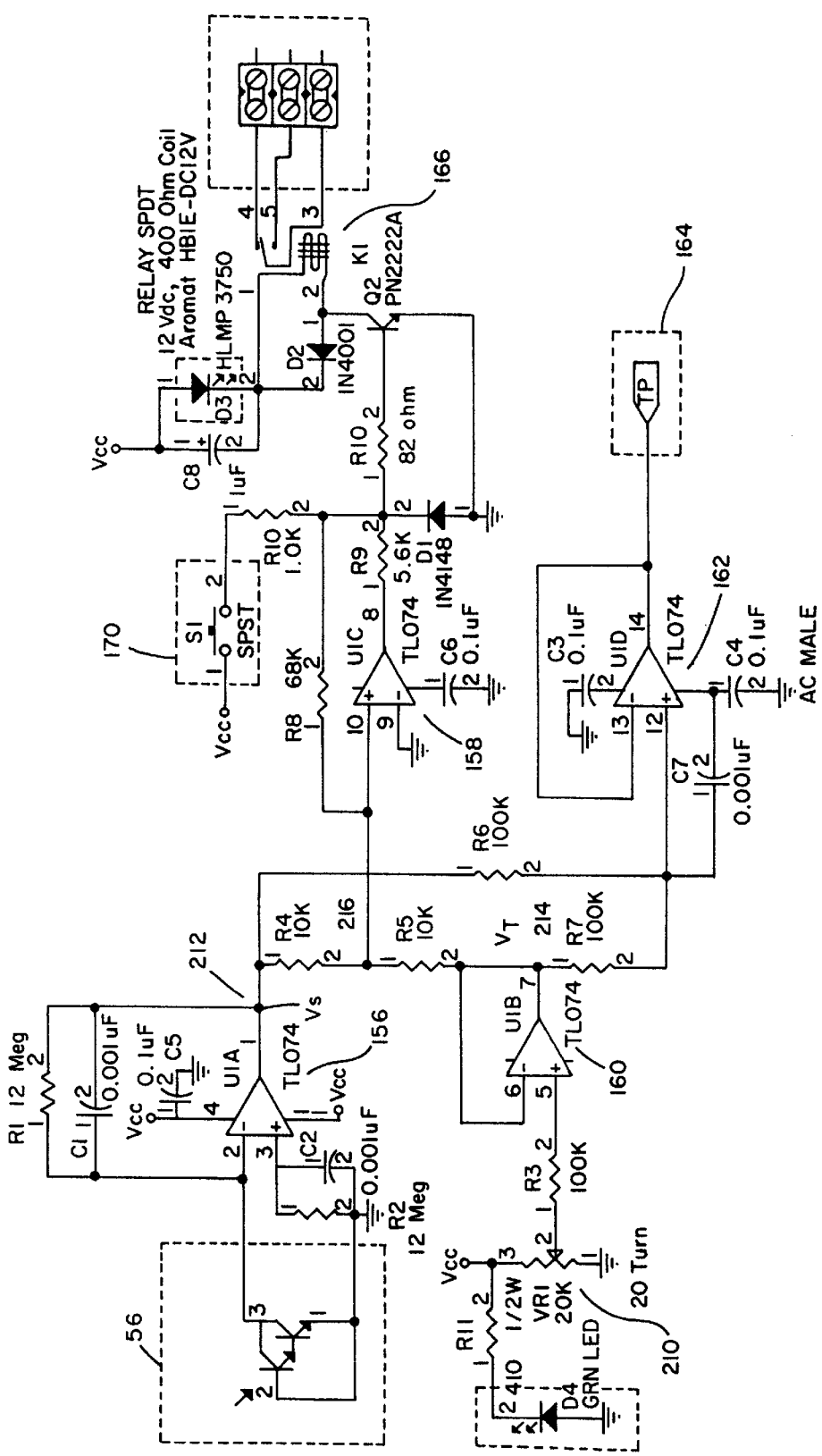
FIG. 4 is a detailed schematic circuit diagram of the signal conditioning circuit represented in the block diagram of FIG. 3.

Signal conditioning circuit 68 operates quickly such that even a momentary loss of the elastic scatter signal, on the order of about 10 to 20 milliseconds, will cause relay 166 to latch off and shut down laser 16. The delay time is set by adjusting transimpedance amplifier 156, in particular, the capacitor C1 shown in the circuit diagram of FIG. 4. Components R1 and C1 form a low pass filter for transimpedance amplifier 156. By adjusting one or the other component, the delay time of transimpedance amplifier 156 can be varied. It is important to have a short delay time to avoid unnecessary shutdown of laser 16 in response to a spurious interruption of the elastic scatter signal. Spurious interruptions are typically caused by bubbles 69 or other anomalies in specimen 12. Comparator 158 has a certain amount of hysteresis that may be adjusted by changing the value of resistor R8. The reference level at which comparator 158 actuates is adjusted using potentiometer 210, which sets the output voltage $V_t$ of reference voltage source 160 at node 214. The detector voltage $V_s$ appears at node 212, and the voltage $V_t$ is subtracted from the voltage $V_s$ at node 216. The remainder is compared to a ground reference voltage by comparator 158. If the remainder is greater than ground, comparator 158 has a high output, indicating that laser 16 is illuminating specimen 12. If the remainder is zero or less than ground, comparator 158 has a low output, which signals that laser 16 is not illuminating specimen 12, either because of a break in an optical fiber in analyzer apparatus 10 or removal of probe 32 from the environment of specimen 12.

The output of comparator 158 drives the base of bipolar transistor Q2. If the output is high, the transistor Q2 is on, and current from $V_{cc}$ holds the contact K1 of relay 166 in the closed position. If the output of comparator 158 is low, the transistor Q2 turns off, the current path to contact K1 is broken, and relay 166 opens. Opening of relay 166 causes power to laser 16 to be either reduced to a harmless level or terminated. Diode D3 receives a visual indication of relay action, while diode D4 indicates that the safety device is powered. Start/reset switch 170 and comparator 158 together form a wired OR circuit. If either input is high, relay 166 closes and high power is supplied to laser 16. If both inputs are low, relay 166 opens and laser 16 shuts off or has its power reduced to a harmless level.

Having thus described the present invention in detail, those skilled in the art will appreciate that further modifications, additions, changes, and alterations to the described embodiment may be made without departing from the spirit and scope of the invention as set forth in the following claims.

What is claimed is:

1. A safety device for detecting elastically scattered radiation, said device comprising:

a source of substantially monochromatic radiation having a controllable output;

detecting means for detecting elastically scattered radiation collected from a specimen illumination by said source of substantially monochromatic radiation; and a signal conditioning circuit comprising transducing means comprising a transimpedance amplifier for converting detected elastically scattered radiation collected from the specimen into an output transducer signal representative of said detected elastically scattered radiation;

a comparator for receiving a predefined threshold signal and the output transducer signal, and generating a control output signal coupled to the source of substantially monochromatic radiation, said control output signal being representative of whether said output transducer signal is greater than, equal to, or less than said threshold signal; and latch means responsive to the control output signal from the comparator for reducing the output of the source of substantially monochromatic radiation when the output transducer signal is less than the predefined threshold signal.

2. The safety device of claim 1 wherein the source of substantially monochromatic radiation comprises a laser.

3. The safety device of claim 2 wherein said substantially monochromatic radiation has a wavelength of about 750 nm to 850 nm.

4. The safety device of claim 1 wherein the detecting means comprises a silicon photodetector.

5. The safety device of claim 1 wherein the latch means comprises a relay.

6. The safety device of claim 5 wherein said latch means further comprises an on/off switch.

7. The safety device of claim 1 wherein the comparator has an adjustable trip point.

8. The safety device of claim 7 wherein the signal conditioning circuit further comprises a buffer amplifier coupled to the transducing means and a reference voltage source coupled to the buffer amplifier, said buffer amplifier being selectively connected to the comparator for generating a test output to adjust the trip point of the comparator.

9. The safety device of claim 1 wherein said specimen is a liquid.

10. An analyzer apparatus provided with a safety device for controlling a source of excitation radiation, said apparatus comprising:

an excitation source of substantially monochromatic radiation having a controllable output;

an optical probe interfacing the excitation source with a specimen, said optical probe comprising:

a first optical channel for carrying radiation from said excitation source to illuminate the specimen;

a second optical channel for collecting radiation elastically scattered by the illuminated specimen; and a third optical channel for collecting radiation inelastically scattered by the illuminated specimen;

first detecting means for detecting radiation elastically scattered by the illuminated specimen;

second detecting means for detecting radiation inelastically scattered by the illuminated specimen;

a signal conditioning circuit comprising:
  transducing means for converting detected elastically scattered radiation collected from the specimen into an output transducer signal representative of said detected elastically scattered radiation; and
  a comparator for receiving a predefined threshold signal and the output transducer signal, and generating a control output signal coupled to the source of substantially monochromatic radiation, said control output signal being representative of whether said output transducer signal is greater than, equal to, or less than said threshold signal; and
latch means responsive to the control output signal from the comparator for reducing the output of the source of substantially monochromatic radiation when the output transducer signal is less than the predefined threshold signal.

11. The analyzer apparatus of claim 10 wherein said apparatus comprises a Raman spectrometer provided with a computer and an optical spectrograph.

12. The analyzer apparatus of claim 11 wherein the Raman spectrometer is further provided with a diamond reference material.

13. The analyzer apparatus of claim 10 wherein the excitation source of substantially monochromatic radiation comprises a laser.

14. The analyzer apparatus of claim 13 wherein said substantially monochromatic radiation has a wavelength of about 750 nm to 850 nm.

15. The analyzer apparatus of claim 10 wherein the first, second, and third optical channels of the probe each comprises at least one optical fiber.

16. The analyzer apparatus of claim 15 wherein said third optical channel further comprises a plurality of optical fibers.

17. The analyzer apparatus of claim 10 further comprising a filter module.

18. The analyzer apparatus of claim 17 wherein said filter module comprises:
  a band pass filter disposed between the excitation source and the first optical channel of the probe in close proximity to said probe; and
  a rejection filter disposed between the third optical channel of the probe and the first detecting means.

19. The analyzer apparatus of claim 18 wherein said band pass filter and said rejection filter each comprises two gradient index lenses.

20. The analyzer apparatus of claim 10 wherein the first detecting means for detecting radiation elastically scattered by the illuminated specimen comprises a silicon photodetector.

21. The analyzer apparatus of claim 10 wherein the second detecting means for detecting radiation inelastically scattered by the illuminated specimen comprises a multi-channel array detector.

22. The analyzer apparatus of claim 21 wherein the multi-channel array detector is a charge-coupled device or a photo-diode array.

23. The analyzer apparatus of claim 10 wherein the transducing means comprises a transimpedance amplifier.

24. The analyzer apparatus of claim 10 wherein the latch means comprises a relay and an on/off switch.

25. The analyzer apparatus of claim 10 wherein the comparator has an adjustable trip point, and the signal conditioning circuit further comprises a buffer amplifier coupled to the transducing means and a reference voltage source coupled to the buffer amplifier, said buffer amplifier being selectively connected to the comparator for generating a test output to adjust the trip point of the comparator.

26. The analyzer apparatus of claim 10 wherein said specimen is a liquid.

27. An optical probe for simultaneously and separately collecting inelastically and elastically scattered radiation from a specimen illuminated with radiation from an excitation source of substantially monochromatic radiation, said probe comprising:
  a fluid-tight body comprising:
    a connector housing disposed at a proximal end of said probe,
    a terminus disposed at a distal end of said probe, and
    a shank disposed between and sealably connected to said connector housing and said terminus;
    each of said connector housing, terminus, and shank being rotationally symmetrical about an axis of said probe;
  a first optical channel for carrying substantially monochromatic radiation from an excitation source to illuminate a specimen disposed near to the distal end of the probe, said first optical channel being disposed within the body of the probe and extending from the proximal end to the distal end of said probe;
  a second optical channel for collecting radiation elastically scattered by the illuminated specimen, said second optical channel being disposed within the body of the probe and extending from the proximal end to the distal end of said probe; and
  a third optical channel for collecting radiation inelastically scattered by the illuminated specimen, said third optical channel being disposed within the body of the probe and extending from the proximal end to the distal end of said probe.

28. The optical probe of claim 27 adapted for use with a Raman spectrometry apparatus.

29. The optical probe of claim 27 wherein the connector housing is provided with three connector pairs, one of each of the connector pairs being connected to each of the first, second, and third optical channels.

30. The optical probe of claim 27 wherein the first, second, and third optical channels each comprises at least one optical fiber.

31. The optical probe of claim 30 wherein each said optical fiber comprises a thin, non-fluorescing, outer buffer layer.

32. The optical probe of claim 31 wherein said outer buffer layer comprises gold.

33. The optical probe of claim 30 wherein each said optical fiber is a step-indexed optical fiber.

34. The optical probe of claim 30 wherein said third optical channel further comprises a plurality of optical fibers.

35. The optical probe of claim 30 further comprising a filter module, said filter module comprising a band pass filter disposed between the excitation source and the first optical channel and a rejection filter disposed between the third optical channel and a detector for elastically scattered radiation.

36. The optical probe of claim 35 wherein the first and third optical channels are each respectively connected to the band pass and rejection filters by at least one optical fiber.

37. The optical probe of claim 36 wherein each said optical fiber comprises a thin, non-fluorescing, outer buffer layer.

38. The optical probe of claim 37 wherein said buffer layer comprises gold.

39. The optical probe of claim 36 wherein each said optical fiber is a step-indexed optical fiber.

40. A method for controlling a radiation source in an analyzer apparatus, said method comprising:

illuminating a specimen being examined by said analyzer apparatus using a source of substantially monochromatic radiation having a controllable output;

collecting elastically scattered radiation from the specimen illuminated by said source of substantially monochromatic radiation;

detecting collected elastically scattered radiation from said illuminated specimen;

using a transimpedance amplifier, transducing detected elastically scattered radiation from the specimen into an output transducer signal representative of said detected elastically scattered radiation;

comparing said output transducer signal with a predefined threshold signal; and generating a control output signal coupled to the source of substantially monochromatic radiation, said control output signal causing the output of said source of substantially monochromatic radiation to be reduced using latch means comprising a relay and an on/off switch when said output transducer signal is less than said threshold signal.

41. The method of claim 40 wherein said analyzer apparatus comprises a Raman spectrometry apparatus, said apparatus being provided with an optical probe for interfacing a laser radiation source with the specimen, a multi-channel detector array, and an optical spectrograph.

42. The method of claim 41 wherein said laser radiation source provides substantially monochromatic radiation having a wavelength of about 750 nm to 850 nm.

43. The method of claim 40 wherein said detecting elastically scattered radiation is carried out using a silicon photodetector.

44. The method of claim 40 wherein said comparing the output transducer signal is carried out using a comparator.

45. The method of claim 40 wherein said specimen is a liquid.

* * * * *